ELECTRICAL CONNECTOR FOR COAXIAL CABLE

Filed Jan. 22, 1965

INVENTOR.
JOHN R. AKER
BY Warren F.B. Lindsley
ATTORNEY

3,315,218
ELECTRICAL CONNECTOR FOR COAXIAL CABLE

John R. Aker, Minoa, N.Y., assignor to General Electric Company, a corporation of New York Filed Jan. 22, 1965, Ser. No. 427,402
6 Claims. (Cl. 339—191)

This invention relates to electrical connectors and more particularly to electrical connectors for coupling a coaxial cable or shielded wire conductor to a panel, circuit board or the like.

The term "circuit board" as employed herein is to be understood as including printed circuit boards employing electrical circuits consisting at least partly of a deposit of electrical conductive material adhering to an insulating sheet or plate.

Circuit boards are very widely employed particularly in the construction of large electronic computers, data processing machines and the like. In these machines, the circuit boards are generally prepared on rigid insulating plates capable of receiving circuit elements such as transistors, diodes, resistors, etc. Generally speaking, the plates of the circuit boards are provided along at least one of its edges with one or more contact terminals. These contact terminals are connected to the various circuits of the plates and are adapted to be engaged in a connector in which appropriately shaped and arranged contact members are disposed to effect a contact with the contact terminals of the circuit boards.

The electrical connections established between the terminals of the circuit boards and the contact members of the connectors must be substantially insensitive to mechanical vibrations and to the oxidizing action of atmospheric agents. For this purpose, the contact members are so made as to exert on the terminals a strong pressure but with such flexibility as not to be likely to damage the contact terminals when the circuits are repeatedly introduced and withdrawn from the connectors.

In accordance with present day practice, apparatus utilizing inputs of high frequency electrical pulses or waves, must be coupled to the circuit boards with the same type of connection as apparatus using low frequency electrical pulses. However, in the high frequency apparatus, high quality transmission lines such as coaxial or shielded wire cables must be used. These cables are usually terminated by connections between the outer and inner conductors of the coaxial cable and the contact terminals of the circuit boards. Heretofore, the coaxial cables have been attached to the terminals of the circuit boards by soldering. The soldering of these coaxial cable conductors to the terminal of the circuit boards involved the handling of very small parts under awkward conditions, causing the attachment of a single coaxial cable to a panel or circuit board to be both tedious and time consuming. If coaxial cable connectors were used, these connectors were complicated structural mechanisms costly to manufacture and use.

In order to overcome the disadvantages of the prior art and to provide interchangeable coaxial cable connectors, a new electrical coupling device is disclosed which utilizes a pair of substantially flat conductive members adapted to be mounted in an overlapping arrangement. Each of the conductive members is provided with a terminal receptacle portion and a conductor attaching portion. The conductor attaching portions of the conductive members are arranged juxtapositioned to each other. An insulating member is arranged between the overlapping ends of the conductive members for insulating the members one from the other and for looking the members into a unitary structure. The conductor attaching portions of the overlapping parts of the members are arranged to engage the center and outer conductors of a coaxial cable. Each of the terminal receptacle portions arranged at the free ends of the conductive members are arranged to engage spaced terminals of a panel or circuit board structure.

Accordingly, it is an object of this invention to provide a new connector for joining coaxial cable or shielded wire conductors to the terminals of a panel or circuit board.

Another object of this invention is to provide a new connector for coaxial cables which may be connected, disconnected and reconnected at will with one or more spaced electrical terminals.

A further object of this invention is to provide a new electrical connector of the "disconnect" type wherein the mating parts fit together in such a manner as to provide large surfaces of contact area.

A still further object of this invention is to provide an electrical connection wherein a high degree of residual pressure for holding the mating contacts together is maintained after connection is made.

A still further object of this invention is to provide a new coaxial cable connector employing contact members formed from pieces of flat stock with a portion of each of the members folded over to form a terminal receptacle.

Other objects and advantages of this invention will become apparent from the following description when taken in connection with the accompanying drawing in which.

Figure 1:
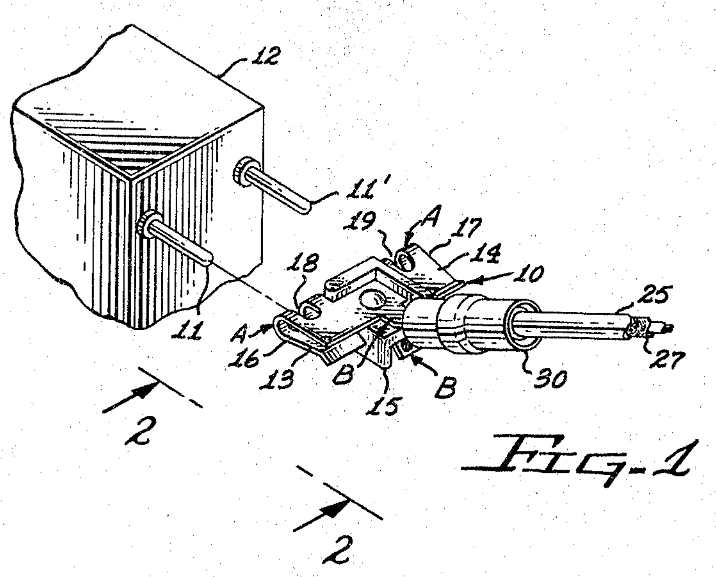
FIG. 1 is a perspective view of a coaxial cable connector and a pair of mating terminals extending from a panel and embodying the invention.

Referring more particularly to the drawing by characters of reference, FIG. 1 discloses a coaxial cable connector 10 in alignment for engagement with a pair of spaced terminals 11, 11' of a panel or circuit board 12. Reference numeral 12 indicates a fragmentary portion of a panel or circuit board made of electrical insulating material. Circuit board 12, for the sake of simplicity, does not show the circuits and electrical elements mounted on it but it is intended that these boards support the usual circuit elements in any desired circuit configuration.

Figure 3:
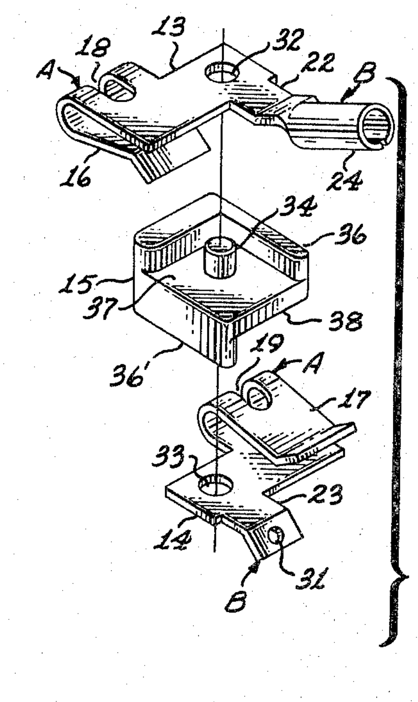
FIG. 3 is an exploded perspective view of the parts of the coaxial cable connector shown in FIGS. 1 and 2.

Connector 10, as shown in FIG. 3, comprises a pair of conductive members 13 and 14 separated by and interconnected with an insulating member 15. Conductive members 13 and 14, which may be stamped from sheet metal, are each provided at one end with a terminal receptacle portion A and at their other ends with a conductor attaching portion B. The terminal receptacle portion of the conductive members 13 and 14 are provided with ears or tab portions 16 and 17. In forming the terminal receptacle portions for terminals 11, 11' of the circuit board 12, the tab portions 16 and 17 of members 13 and 14 are folded back on themselves into a U-shaped configuration. Each U-shaped configuration defines a clamp comprising a bight and a pair of legs resiliently biased toward each other. Apertures 18 and 19 are provided in the bight of the U-shaped configurations of the terminal receptacle portions of conductive members 13 and 14 for receiving the shanks of terminals 11, 11' when they are inserted between the legs of the clamps. The legs of the clamps formed by the U-shaped configuration tightly grip the terminals of the circuit boards to form good electrical connections having large contact areas.

The contact attaching portions of conductive members 13 and 14 are provided with ears 22 and 23. Ear 22 of member 13 is provided with a split hollow cylindrical extension 24 adapted for receiving within its outline the end of a coaxial cable 25. A metallic sleeve 26, loosely mounted around the coaxial cable 25, is slid over the cylindrical extension 24 of ear 22 when the end of the coaxial cable is placed within extension 24. Sleeve 26 is then crimped to cause the split of the cylindrical extension to close and the cylindrical extension to tightly grip the outer conductive braid 27 of coaxial cable 25. As well known in the art, the coaxial cable or shielded conductor comprises a center conductor 28 covered by one or more layers of insulation all surrounded by the metallic shield or conductive braid 27. The conductive braid 27 may serve as a grounding conductor. The metallic sleeve 26 is then covered with an insulating sleeve 30 which may be formed of any suitable plastic material.

Figure 2:
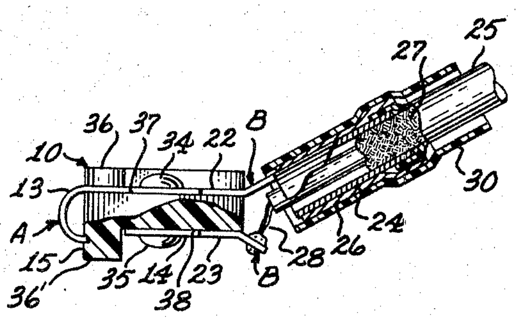
FIG. 2 is an enlarged cross sectional view of the coaxial cable connector shown in FIG. 1.

As shown in FIG. 2, the cylindrical extension 24 of ear 22 is in electrical contact with braid 27 of coaxial cable 25 and forms the conductor attaching portion of conductive member 13. Ear 23 forms the contact attaching portion of conductive member 14 and is provided with an aperture 31 through which conductor 28 of coaxial cable 25 may extend for affixing conductor 28 to the conductive member in any suitable manner, such as by soldering.

Conductive members 13 and 14 are provided with apertures 32 and 33, respectively, at their contact attaching ends for receiving plugs 34 and 35 of insulating member 15. Although the apertures and plugs are shown as being of a circular cross sectional area configuration, it is intended that they may have any other desirable shape, such as a rectangular cross sectional area configuration.

Insulating member 15 is provided with ridges 36 and 36′ along at least a part of the periphery of its surfaces 37 and 38. These ridges restrict the rotational movement of conductive members 13 and 14 when plugs 34 and 35 of insulating member 15 are inserted into apertures 32 and 33 to form members 13 and 14 into a unitary structure.

In assembling members 13, 14 and 15 into a unitary structure, conductive members 13 and 14 are positioned in an overlapping aligned arrangement, as shown in FIG. 3, with one of the members 13 or 14 rotated 180 degrees with reference to the other member. Conductive members 13 and 14 are then separated and electrically insulated one from the other by insulating member 15 which is arranged between members 13 and 14 as shown. Plugs 34 and 35 are inserted into apertures 32 and 33 and hold members 13 and 14 firmly together. Th ridges 36 and 36′ restrain members 13 and 14 from rotating one with respect to the other.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. An electrical connector for connecting the conductors of a coaxial cable to a pair of spaced terminals, said connector comprising a pair of metallic members adapted to be assembled into a unitary structure, each of said members having a terminal receptacle portion and a conductor attaching portion, said terminal receptacle portion comprising an elongated tab of sheet metal folded back upon itself to define a bight and a pair of legs resiliently biased toward each other extending from said bight, said conductor attaching portions of said members being positioned in an overlapping arrangement, means arranged between said overlapping conductor attaching portions of said members for interconnecting and insulating said members one from the other, and means for connecting said conductor attaching portions of said members to different electrical conductors of the coaxial cable, each of said terminal receptacle portions of said members being arranged at opposite sides of said connector and positioned to receive between said legs a different electrical terminal, said conductor attaching portions of said members being arranged between said terminal receptacle portions of said members.

2. An electrical connector for connecting the conductors of a coaxial cable to a pair of spaced terminals, said connector comprising a pair of substantially flat metallic members adapted to be assembled into a unitary structure, each of said members having a terminal receptacle portion and a conductor attaching portion, said terminal receptacle portion comprising an elongated tab of sheet metal folded back upon itself to form a bight and a pair of legs resiliently biased toward each other, said bight of each receptacle portion being provided with an aperture, said conductor attaching portions of said members being positioned in an overlapping arrangement, means arranged between said overlapping conductor attaching portions of said members for insulating said members one from the other and for locking said members together into a unitary structure, and means for connecting said conductor attaching portions of said members to different electrical conductors of the coaxial cable, each of said terminal receptacle portions of said members being arranged to receive through the aperture in each of said bights and between said legs a different electrical terminal.

3. An electrical connector for connecting the conductors of a coaxial cable to a pair of spaced terminals, said connector comprising a pair of substantially flat metallic members adapted to be assembled into a unitary structure, each of said members having a terminal receptacle portion and a conductor attaching portion, each of said conductor attaching portions of said members being provided with an aperture, said conductor attaching portions of said members being positioned in an overlapping arrangement, means arranged between said overlapping conductor attaching portions of said members for interconnecting and insulating said members one from the other, said means being provided with a pair of plugs for insertion one into each of the apertures in said conductor attaching portions for locking said members into a unitary structure, and means for connecting said conductor attaching portions of said members to different electrical conductors of the coaxial cable, each of said terminal receptacle portions of said members being arranged to receive a different electrical terminal.

4. An electrical connector for connecting the conductors of a coaxial cable to a pair of spaced terminals, said connector comprising a pair of substantially flat metallic members adapted to be assembled into a unitary structure, each of said members having a terminal receptacle portion and a conductor attaching portion, said terminal receptacle portion comprising an elongated tab of sheet metal folded back upon itself to define a bight and a pair of legs resiliently biased toward each other, each of said conductor attaching portions of said members being provided with an aperture, said conductor attaching portions of said members being positioned in an overlapping arrangement, means arranged between said overlapping conductor attaching portions of said members for interconnecting and insulating said members one from the other, said means being provided with plugs for insertion one into each of said apertures for connecting said members into a unitary structure, and means for connecting said conductor attaching portions of said members to different electrical conductors of the coaxial cable, each of said terminal receptacle portions of said members being arranged to receive between said legs a different electrical terminal.

5. An electrical connector for connecting the conductors of a coaxial cable to a pair of spaced terminals, said connector comprising a pair of substantially flat metallic members adapted to be assembled into a unitary structure, each of said members having a terminal receptacle portion and a conductor attaching portion, said terminal receptacle portion comprising an elongated tab of sheet metal folded back upon itself to define an apertured bight and a pair of legs resiliently biased toward each other, said conductor attaching portions of said members being positioned in an overlapping arrangement, means arranged between said overlapping conductor attaching portions of said members for interconnecting and insulating said members one from the other, said means being provided with ridges along at least a part of its edges for restraining rotational movement of said members, and means for connecting said conductor attaching portions of said members to different electrical conductors of the coaxial cable, each of said terminal receptacle portions of said members being arranged to receive through said apertured bights and between said legs a different electrical terminal.

6. An electrical connector for connecting the conductors of a coaxial cable to a pair of spaced terminals, said coaxial cable having a center conductive path surrounded by insulated material and an outer conductive path, said connector comprising a pair of substantially flat metallic members adapted to be assembled into a unitary structure, each of said members having a terminal receptacle portion and a conductor attaching portion, said terminal receptacle portion comprising an elongated tab of sheet metal folded back upon itself to define a bight and a pair of legs resiliently biased toward each other, each of said conductor attaching portions of said members being provided with an aperture, said conductor attaching portions of said members being positioned in an overlapping arrangement, means arranged between said overlapping conductor attaching portions of said members for interconnecting and insulating said members one from the other, said means being provided with plugs for insertion one into each of said apertures for connecting said members into a unitary structure, and means for connecting said conductor attaching portions of said members to different electrical paths of the coaxial cable, each of said terminal receptacle portions of said members being arranged to receive between said legs a different electrical terminal, one of said conductor attaching portions of said members being formed as a hollow cylinder for surrounding and electrically engaging the outer conductive path of said coaxial cable.

References Cited by the Examiner

UNITED STATES PATENTS

| | | | |
|---|---|---|---|
| 2,927,298 | 3/1960 | Griffith | 339—17 |
| 2,953,769 | 9/1960 | Woofter et al | 339—17 X |
| 3,097,906 | 7/1963 | Shannon | 339—256 X |
| 3,179,914 | 4/1965 | Uberbacher | 339—177 X |

FOREIGN PATENTS

| | | |
|---|---|---|
| 638,164 | 3/1962 | Canada. |

EDWARD C. ALLEN, *Primary Examiner.*

W. DONALD MILLER, *Examiner.*